Feb. 10, 1970     O. S. GRAY     3,494,723

METHOD AND APPARATUS FOR CONTROLLING MICROORGANISMS AND ENZYMES

Filed Dec. 5, 1967     2 Sheets-Sheet 1

INVENTOR:
OSCAR S. GRAY
BY Howson & Howson
ATTYS.

INVENTOR:
OSCAR S. GRAY

United States Patent Office 3,494,723
Patented Feb. 10, 1970

3,494,723
METHOD AND APPARATUS FOR CONTROLLING MICROORGANISMS AND ENZYMES
Oscar S. Gray, Fort Lauderdale, Fla., assignor to Gray Industries, Inc., Fort Lauderdale, Fla., a corporation of Delaware
Continuation-in-part of application Ser. No. 479,140, Aug. 12, 1965. This application Dec. 5, 1967, Ser. No. 688,260
Int. Cl. B65b 55/02
U.S. Cl. 21—54
31 Claims

ABSTRACT OF THE DISCLOSURE

Material containing microorganisms or enzymes is subjected to microwave energy while held in a confined zone permeable to microwave energy and while a coolant gas is flowed in contact with the exterior of the confined zone. There is also provided apparatus embodying means for directing microwave energy and coolant gas toward the confined zone containing the material to be treated.

Cross reference to related applications

This application is a continuation-in-part of copending application Ser. No. 479,140 filed Aug. 12, 1965 and now abandoned.

Background of the invention

The preservation of organic materials of natural origin, like foods (including beverages) blood (including plasma and serum), tobacco, and the like, has been the subject of much investigation over many years. The two principal means involve either the use of chemicals or the use of heat, or a combination of these. The use of chemicals for preservation is not only objectionable due to the taste or odor or other undesirable change imparted but is also prohibited with certain materials, like milk. The use of heat to sterilize (as distinguished from pasteurization) such materials has not achieved commercial importance with many of them, like milk, due principally to the fact that the temperatures attained to produce a sterile product also cause deleterious alterations in the material undergoing sterilization treatment resulting in objectionable flavor and other undesired changes. For example, as is well known, the simple heating of milk to a temperature required for sterilization, such as high temperature—short time methods, like steam injection, at temperatures of 280° F. and above, causes flavor changes. Steam injection dilutes the product, and, to overcome this, water must be preliminarily removed therefrom necessitating an additional step which itself can have an adverse effect on the product. Sterilization of whole blood by simple heating causes haemolysis of the blood.

There have been suggestions for using electromagnetic energy, including microwave energy, to preserve or sterilize certain materials or to otherwise affect microorganisms and enzymes (see, for example, U.S. Patents 2,107,830; 2,133,203; 2,223,813; 2,576,862, and 2,833,657; Industrial Microwave News, November, 1963; German Patent 901,840 and Danish Patent 80,930). However, the use of microwave energy for preserving or sterilizing has not reached substantial commercial use, as far as is known. In the light of my research, this has most likely been due to deleterious thermal changes that take place in material subjected to microwave energy.

A recent significant advance in the art of sterilizing is the subject matter of copending application Ser. No. 649,640, filed June 28, 1967 (as a continuation-in-part of application Ser. No. 345,625, filed Feb. 18, 1964, and now abandoned) which involves the use of microwave energy and steam. As will appear hereinafter, the present invention represents a departure from and an improvement over the subject matter of the stated application.

It is the principal object of the present invention to provide a novel improved method for controlling microorganisms and enzymes in materials containing them utilizing microwave energy.

It is another principal object of the present invention to provide a novel improved method for pasteurizing, sterilizing or preserving materials.

It is another object of the present invention to provide a novel method for pasteurizing, sterilizing or preserving materials wherein disadvantages of prior techniques are not encountered.

A specific object of the present invention is to provide a novel method for preserving organic materials of natural origin wherein the resulting product, even though it may be completely sterile, is otherwise not detectably altered in desirable characteristics from the original, untreated material.

A further specific object of the present invention is to provide a novel method for preserving perishable organic materials of natural origin whereby such materials may be quickly and easily treated without altering, beyond reduction or destruction of microorganisms or enzymes therein, the chemical nature of the material to any detectable extent.

A still further specific object of the present invention is to provide a method of preserving edible materials without producing objectionable flavor or appearance therein.

A particular, preferred object of the present invention is to provide a new and improved method for sterilizing using microwave energy.

A further principal object of the present invention is to provide a novel apparatus whereby, the foregoing objects may be realized.

Other objects will become apparent from a consideration of the following specification and the claims.

Summary of the invention

The method of the present invention comprises, in the control of substances causing deterioration selected from the group consisting of microorganisms and enzymes in material containing them by subjecting said material to microwave energy until the desired control is achieved, the improvement wherein the material is subjected in a treating zone and while contained in a confined zone within said treating zone at least one wall of which confined zone is permeable to microwave energy, to microwave energy through a moving atmosphere of coolant gas under superatmospheric pressure until said control is achieved, said moving atmosphere being in direct contact with walls of said confined zone but out of direct contact with said material undergoing treatment and being at a temperature below about 60° F. upon its admission to said treating zone and then discontinuing the passage of microwave energy into said material in said confined zone. Preferably, the circulation of coolant gas is continued, after discontinuance of the passage of the microwave energy, for a period to cool the material to a temperature below that which it reached during treatment with the microwave energy.

As will appear hereinafter, the present invention may be employed simply to arrest the growth of microorganisms or reduce their number short of complete destruction, referred to herein as pasteurization or partial sterilization; or to destroy all the microorganisms, referred to herein as sterilization; or simply to deactivate enzymes in a material essentially free of microorganisms. Deactivation of enzymes may take place along with pasteurization or sterilization.

In a specific preferred embodiment of the method, the confined zone containing the material to be treated is a sealed package thereof, at least one wall of which is permeable to micowave energy. In a further specific preferred embodiment of the method, the confined zone is a tubular pathway, walls of which are permeable to microwave energy, through which a flowable perishable material may be forced for treatment, and after which the material may be aseptically filled into sterile containers which are then sealed.

The novel apparatus of the present invention comprises a chamber, microwave energy generation means adapted to direct microwave energy into said chamber, means for admitting to and removing the material, in a confined zone, from said chamber, means for holding said material in said chamber in a position to receive said microwave energy, means for cooling a gas, means for admitting the coolant gas to said chamber under superatmospheric pressure and means for removing gas from said chamber. In the preferred apparatus means are included to continue contact between said coolant gas and the material after the material has stopped receiving the microwave energy.

In a specific preferred embodiment of the apparatus, means for admitting and removing the material, in this case flowable material, as well as the means for holding the material in the chamber, are tube means walls of which are permeable to microwave energy. In a further specific preferred embodiment, primarily adapted for the treatment of a plurality of sealed packages of material in a continuous manner, said chamber is enlarged to hold a plurality of packages at one time and the means for holding the packaged material is a moving surface, such as an endless belt, for moving the packages into, through and out of the chamber.

Brief description of the drawings

The present invention will be more readily understood from a consideration of the drawings in which.

Figure 1:
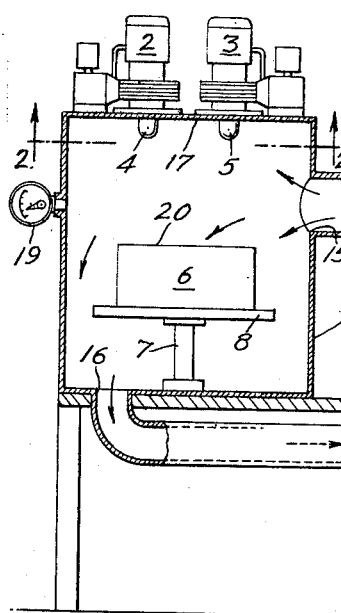
FIGURE 1 is a side elevational view, partly in section, of one form of apparatus that may be used according to the present invention, especially for the treatment of sealed packages of material.

As is well known, microwave energy is the electromagnetic wave energy of a wave length falling in the microwave region of the electromagnetic spectrum. The Federal Communications Commission has presently set aside, for microwave processing, bands of microwave energy within the range of between about 400 and about 20,000 megacycles per second with a wave length ranging from about 13 inches for the lower frequencies to about .7 inch for the highest frequencies; specifically: frequencies of about 890–940 with a wavelength of about 13 inches; frequencies of about 2400–2500 with a wavelength of about 4–5 inches, and frequencies of 17,850–18,000 with a wavelength of about 0.7 inch. The presently preferred microwave energy for use according to the present invention is an intermediate range having a frequency from about 1000 to about 5000, more particularly from about 2000 to about 3000, megacycles per second. Microwave energy is generated from a suitable high frequency source, such as a magnetron. The generation and use of microwave energy by itself is well known since such has been used for many years in the cooking of food.

It has been found that the use of microwave energy alone to control microorganisms and enzymes in material containing them produces varying and deleterious results. Most notable are the thermal effects on the material resulting in undesirable physical and chemical changes therein. In the light of my research, it is believed that in order to affect the entire mass of material undergoing treatment, the interior as well as the peripheral position, to the point where all microorganisms and/or enzymes therein are subjected to the required influence of the microwaves to provide the desired control, portions of the material become subjected to excessive influence to the point, beyond the desired control, where deleterious thermal effects occur in those portions. For example, subjecting milk, as in a glass bottle, to microwave energy sufficient to sterilize it results in coagulation, marked changes in flavor, and the like, commonly occasioned by cooking milk. I believe that this is caused by a wide differential in microwave effect between the peripheral portions of the milk (that portion adjacent the glass and where the microwaves first enter the milk) and the interior portion (the portion farthest removed from the glass and last to be reached by the microwaves). Microwaves excite molecules in the milk whereby they attempt to align themselves with the direction of the field, oscillating about their axes thus creating intramolecular friction and producing heat. I believe that the magnitude of excitation in a given mass being subjected to microwave radiation is directional in the sense that, at any given time during irradiation, the further a point in the mass is away from the surface where the microwave energy enters the mass, the less the level of excitation, and hence the lower the temperature. This differential means, I believe, that in order to excite the molecules in the interior of the mass of milk in the bottle, in the foregoing illustration, to the point where the desired control of microorganisms is achieved in that portion, the peripheral portion has already far exceeded that level and has become heated to the point where the undesirable thermal changes take place. In accordance with the present invention, however, the stated differential is markedly decreased by virtue of the coolant gas. The coolant gas, being under some positive pressure and flowing over the confined zone holding the material being irradiated, and particularly past the wall thereof through which the microwave energy permeates into the material, abstracts heat from the wall and hence from the material adjacent thereto within the confined zone. The cooled wall acts, I believe, as a "heat sink." This has the effect of preventing excessive rise in temperature in the peripheral portions of the material being irradiated and provides a lower temperature differential from the peripheral to the interior portions during irradiation. Hence, the interior portions can be allowed to reach the desired level of excitation, heat generation and temperature without deleterious thermal changes occurring in the peripheral portions. The reduced temperature differential may be further reduced (including reversed), in accordance with preferred practice, by continuing the circulation of the coolant gas after irradiation with the microwave energy is discontinued. This abstracts further heat and reduces the temperature not only of the peripheral portion but also of the entire mass. Thus, the present process permits rapid and relatively uniform rise in temperature of the entire mass to the level required for the desired control, by virtue of the coolant gas during irradiation (an even excitation of the molecules under controlled conditions) followed substantially immediately by a relatively rapid lowering of temperature. In this connection, the material may be even further cooled by other cooling means. Parts of the foregoing discussion have dealt with theory in an attempt to explain the mechanism of the present invention and to such theoretical explanation I do not wish to be bound. Nevertheless, as will be apparent from the examples and data set forth hereinafter, the invention is a marked advance in the field of pasteurization, preservation and sterilization.

Description of the preferred embodiments

Referring to FIGURE 1, 1 represents the treating chamber or zone constructed to withstand the gas pressure that may be employed. Conventional magnetrons 2 and 3, provided with antennae 4 and 5, respectively, are arranged and adapted to direct microwave energy into chamber 1 and, hence, into the package (container) 6 bearing the material to be treated. The top of chamber 1 defining platform 17 holding magnetrons 2 and 3 may be detachable from the bottom portion to provide means for admitting and removing the material to be treated. Chamber 1 may be provided with a door, not shown. Package 6, at least the wall 20, of which is permeable to microwave energy, is held in any suitable manner to receive the microwave energy from magnetrons 2 and 3 and to be bathed by the moving coolant gas atmosphere, discussed further below, as by rack 7 the platform 8 of which is preferably a rigid plastic material, like polymethylmethacrylate.

Cooling chamber or zone 9 is provided with cooling coils 10 and blower 11. The coolant gas, charged initially to the system as through valved conduit 12 and, in operation of the process and apparatus, recirculated from chamber 1 to chamber 9 through conduit 13, is forced by blower 11 past cooling coils 10 which are connected to a conventional refrigeration unit shown schematically at 18. The resulting cooled gas is forced, by way of conduit 14, into chamber 1. The flow of the coolant gas in the system is shown by arrows, and it will be seen that by virtue of the locations of coolant gas entrance 15, package of material 6 and coolant gas exit 16, the gas must flow around and past package 6. In its passage through chamber 1 and past package 6 the gas becomes heated, and, to be recirculated and reused, it must be cooled back to the desired temperature. To note gas pressure in chamber 1, a pressure gauge 19 may be provided.

As will be apparent, other and equivalent means for cooling the coolant gas may be employed. For example, instead of using a refrigeration system utilizing a separate refrigerant, as illustrated in FIGURE 1, the coolant gas may be cooled by compression and expansion thereby, in effect, itself serving as the refrigerant.

Figure 2:
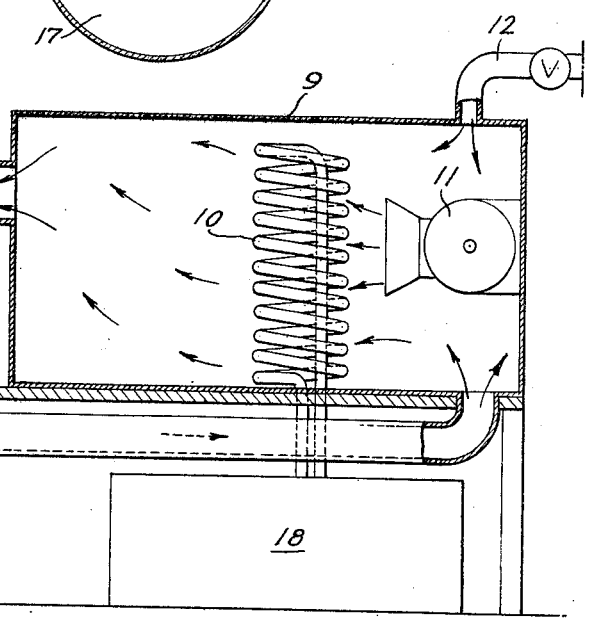
FIGURE 2 is a plan sectional view of apparatus shown in FIGURE 1 as seen from line 2—2.

In practicing the invention according to FIGURES 1 and 2, the package 6 of material to be treated is placed in chamber 1 and the coolant gas is circulated as shown by the arrows in the FIGURE 1. Magnetrons 2 and 3 are turned on for the time required, and then turned off. Preferably, the circulation of coolant gas is continued for a short time, after magnetrons 2 and 3 are turned off, to cool the package, generally to below 150° F., before removing it from chamber 1.

Figure 3:
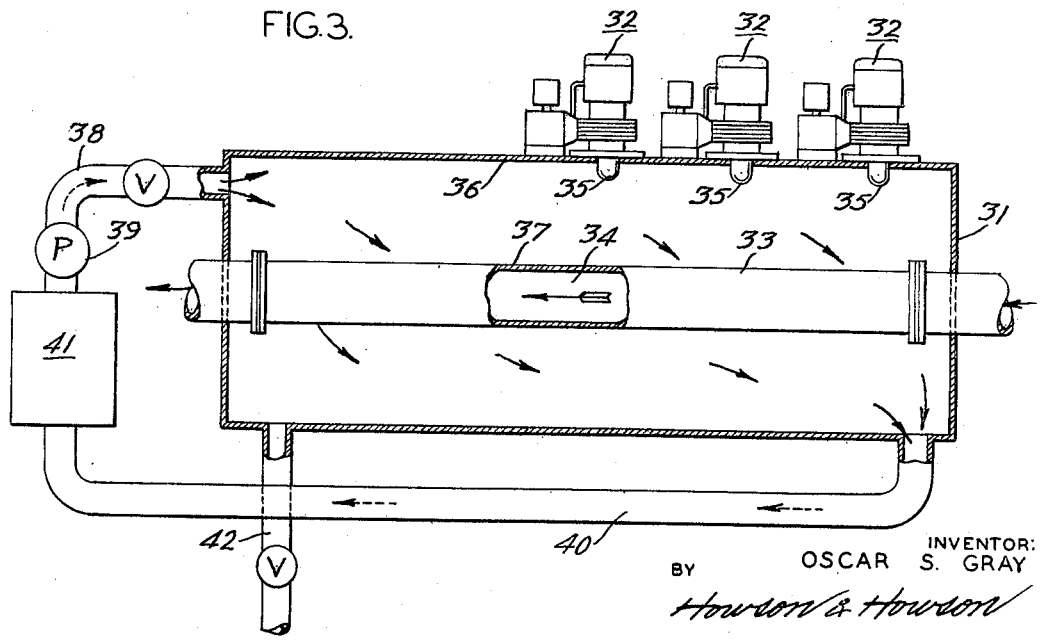
FIGURE 3 is a side elevational view, partly in section, of apparatus that may be used according to the present invention, especially for the treatment of flowable material.

FIGURE 3 illustrates treatment of flowable material in apparatus especially adapted therefor. In this case treating chamber or zone 31 is somewhat elongated and provided with a plurality of magnetrons 32 the number of which may be dictated by the length of the confined path, such as tube 33, and the velocity at which flowable material 34 flows therethrough. Tube 33 may be of material permeable to microwave energy, such as glass, borosilicate type glass or quartz. Magnetrons 32 and their associated antennae 35 may be supported, as by plate 36 of aluminum, for example, so as to direct microwave energy through the wall 37 of tube 33 and into material 34. Coolant gas, the flow of which is illustrated by arrows, is forced into chamber 31 through valved conduit 38, as by pump 39. Advantageously, the flow of coolant gas is substantially counter to the flow of material 34. The coolant gas, removed from chamber 31 and recirculated through conduit 40, is cooled in cooling chamber shown schematically at 41. Chamber 31 may be provided with a drain, as valved conduit 42, to remove condensed moisture which might accumulate in the chamber. Material 34 flows from right to left so that the latter stage of its flow is out of the field of direct irradiation but still subject to the cooling effect of coolant gas.

In operation according to FIGURE 3, the flow of coolant gas is circulated, coolant gas and the operation of magnetrons 32 are continuous so long as material 34 is flowed through tube 33. The flow velocity of material 34 may be adjusted to provide, with the amount of microwave energy generated and the nature, temperature and pressure of coolant gas, a residence time within chamber 31 adequate to treat each increment of material 34 in its passage through the treatment zone. Flowable material 34 may be forced into and through tube 33 by a pump or by screw means in the case of materials having a high solids content. The treated material leaving chamber 31 may be aseptically filled into sterile containers and sealed.

While FIGURE 3 illustrates a single tube, it will be apparent that a plurality of tubes may be present in a single chamber. Likewise, while FIGURES 1 and 3 illustrate a single chamber, it will also be obvious that a plurality of chambers may be employed. For example, a plurality of units may be arranged on a rotatable table on which at one station, a unit is filled with the material to be treated, the unit then being moved during the course of treatment to a final station at which the material is removed from the unit.

Figure 4:
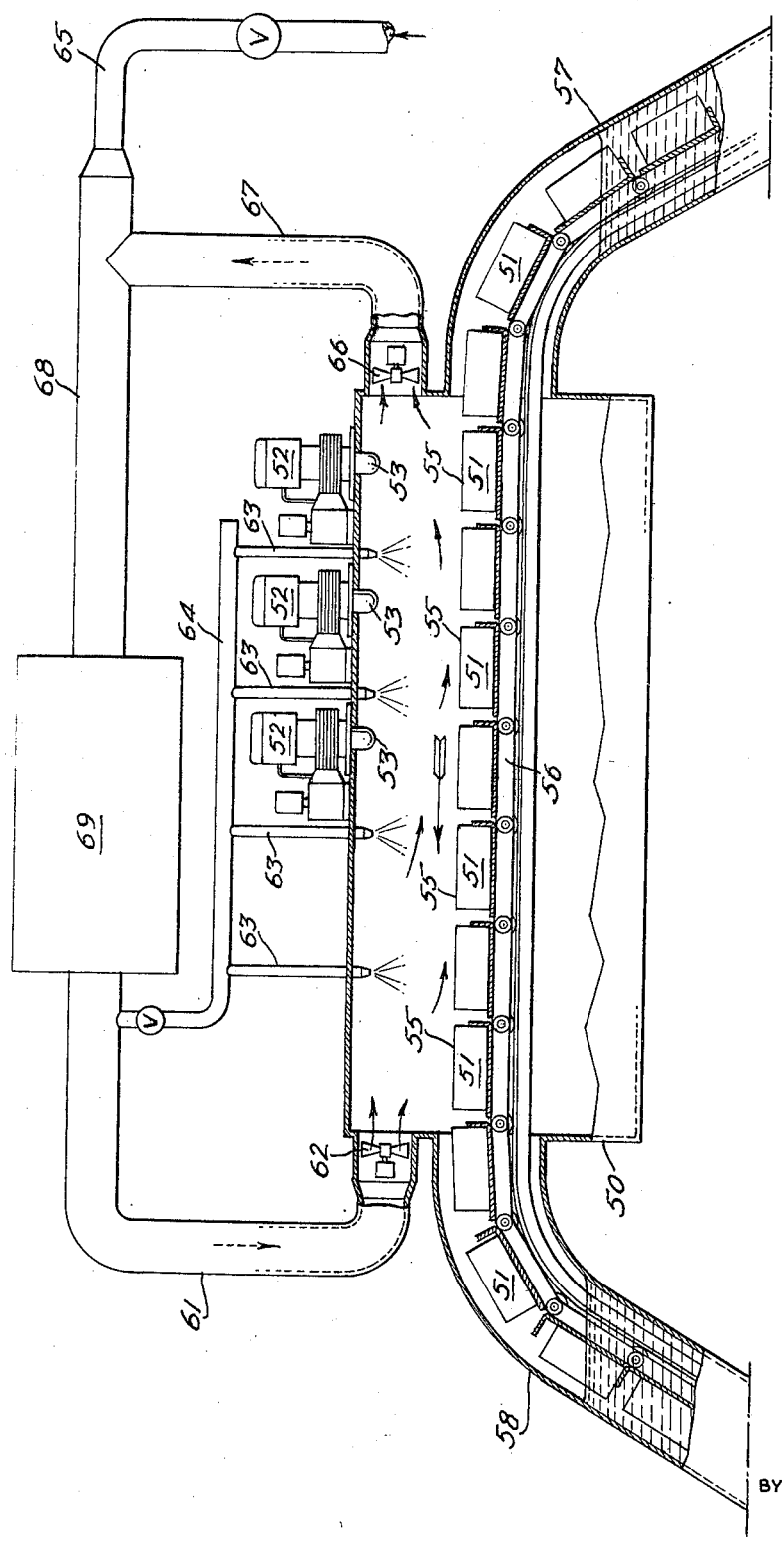
FIGURE 4 is a side elevational view, partly in section, of apparatus that may be used according to the present invention, especially for the treatment of a plurality of packages of material in a continuous manner.

FIGURE 4 illustrates the treatment of a plurality of containers in a continuous manner. In this embodiment treating chamber or zone 50 is elongated to accommodate a plurality of aligned containers 51 of material being treated during their passage therethrough. A plurality of magnetrons 52, with associated antennae 53, is provided to provide the requisite microwave energy. Magnetrons 52 are supported, as by plate 54, so as to direct microwave energy toward and into containers 51. As in FIGURE 1, at least the wall of the container facing the source of the microwave energy—in this case wall 55—will be permeable to microwave energy. Containers 51 are supported in this embodiment on a moving surface, shown as endless belt 56, adapted to move the containers into, through and out of chamber 50. Escape of gas from chamber 50 may be prevented by conventional sealing means, such as water-legs 57 and 58, respectively. Containers 51 move from right to left so that the latter stage of their movement is out of the field of direct irradiation but still subject to the cooling effect of the coolant gas. In addition, submersion of the containers in the water of water leg 58 may serve further to cool them.

Coolant gas is forced into chamber 50 through main conduit 61, as by fan 62, and also may be admitted through smaller conduits 63 connected to valved conduit 64. Coolant gas may be charged from a source through valved conduit 65. Spent coolant gas is withdrawn from chamber 50, aided by fan 66, through conduits 67 and 68 and passes through cooling means, shown schematically as 69, before returning to chamber 50.

Operation according to FIGURE 4 is much like that according to FIGURE 3 with the flow of coolant gas and operation of the magnetrons continuing as long as containers of material to be treated are moving through the treating chamber. The number and size of magnetrons, the nature, temperature and pressure of coolant gas and velocity of the movement of the containers through the chamber may be adjusted to provide a residence time for each container sufficient to result in the desired treatment of the contents thereof.

In designing and operating apparatus according to the present invention, consideration will be given to providing matched load conditions as is known to those familiar with microwave processing.

As will be seen from the foregoing, an essential feature of the present invention is holding the material being treated in a confined zone during the treatment. The walls of the confined zone may be conventional substantially gas-impermeable packaging materials like glass, methylmethacrylate, polystyrene and polyethylene, as in bottles, jars, flasks and tubes; sheets, especially thermoplastic, heat-sealable films like polyvinylidene chloride, polyethylene terephthalate, copolymers of vinylidene chloride and vinyl chloride, polyethylene, cellophane, plastic-coated paper and cardboard, and the like. Part of the container may be of material impermeable to microwave energy, like aluminum foil and steel (as in a "tin" can) so long as the wall of the container facing the source of microwave energy is permeable thereto. For example, the container for the material being treated may be an aluminum foil tray with a film of microwave permeable film as a cover. Or, as in the case of sterilization in conjunction with canning, the container may be a can the open top of which is covered with, say, a polymethylmethacrylate or glass plate through which the microwaves may travel. The confined zone will be substantially gas tight. It will be seen that FIGURES 1, 2 and 4 illustrate the containers schematically and these may be in any form, such as bottles, jars, flasks, cans, trays, pouches, envelopes, boxes and the like.

The coolant gas employed may be any substantially inert (non-reactive with the environment in the presence of microwave energy) gas existing as a gas at the temperatures employed, especially nitrogen or carbon dioxide. While gases like argon, helium, neon, krypton, xenon, ethylene oxide, and mixtures thereof, and the like, are equivalent, they are less desirable at present because of their cost.

The temperature of the coolant gas entering the treating zone or chamber should be below about 60° F.; and preferably below about 55° F. While the temperature thereof may go as low as 0° F., there is no advantage in it going below about 20° F., and at such lower temperatures there may be freezing problems if the material being treated contains water and is left in the treating zone containing the cold gas for extended periods after the source of microwave energy has been turned off. A temperature for the incoming coolant gas between about 30 and about 50° F. has been found to be particularly suitable. The coolant gas will become warmed during its travel through the treating zone, particularly from contact with the walls of the confined zone, holding the material being sterilized. When the gas is recirculated for reuse the temperature thereof must be reduced back to the desired temperature for admission to the treating zone.

The pressure of the coolant gas in the treating zone will, as stated, be above atmospheric. The particular pressure employed may depend upon the strength of the walls of the confined zone containing the treated material since one of its functions may be to prevent rupturing of the walls through increase in internal gas pressure. In addition, since the principal function of the coolant gas is to keep the walls of the confined zone at a temperature well below that of the material being treated, abstracting heat from the peripheral portions of the material, forcing the coolant gas into the treating chamber and past the walls of the confined zone under pressure provides more efficient overall cooling without some area or areas of the walls becoming insufficiently cooled. Pressures as low as 0.5 p.s.i.g. have been used and pressures as high as 50 p.s.i.g. may be desirable. In general, pressures from about 2 to about 40 p.s.i.g. have been found to be particularly suitable.

The precise time of treatment with microwave energy according to the present invention will depend upon the ultimate temperature to be reached by the particular material undergoing treatment, which may, in turn, depend upon the nature of the treatment desired (i.e. pasteurization, sterilization or deactivation of enzymes) and the nature of the material and the microorganisms and/or enzymes therein as well as upon the size and initial temperature of the mass of the material being treated, the temperature of the coolant gas, and other variable factors which control the flow of heat and the heating of a particular material from one temperature to another. Obviously, therefore, it is not possible to state a range of temperatures and times which will be applicable for all materials, treatments and embodiments of apparatus design. In any event, the time of treatment will be that resulting in the desired level of control of the microorganisms and/or enzymes in the particular material. In other words, in the case of sterilization, the minimum time is dictated by the reduction of the microorganism count to zero; in the case of pasteurization the time is dictated by reduction of the microorganism count to the desired lever, and in the case of enzyme deactivation the time is dictated by deactivation of the enzyme. This can be determined by routine conventional microorganism (bacteria and fungi) count tests and enzyme deactivation tests. In the case of organic materials of natural origin which themselves deteriorate through the action of such microorganisms and/or enzymes, it is probably more satisfactory in view of the many variables involved, particularly in the nature of the materials treated, to subject samples of the particular treated material to accelerated incubation tests to arrive at the precise conditions preferred for that material.

As will appear from the foregoing and from the following examples, the present invention is applicable to the pasteurization, sterilization or enzyme deactivation of all types of materials. This includes foodstuffs which are perishable, that is, which are subject to deleterious change by the action of microorganisms (bacterial and/or fungi) or enzymes and which contain moisture. The food may range in consistency from thin liquids to solids. Examples of such foodstuffs are milk (whole milk, homogenized whole milk, skimmed milk, concentrated milk and the like milk products); fruit and vegetable juices (including juice concentrates); beer, wine and other manufactured bevereges, like "soft" drinks, soups; grains, like raw or cooked corn, and cooked rice; vegetables; fruit; stews, soups; meat, including fish and poultry; eggs; pastries; bread; sandwiches; and the like. The food as treated may be raw, cooked (including baked) or partially cooked. Also applicable are materials which, although they are organic materials of natural origin like the foodstuffs mentioned above, are not normally considered edible, such as blood (whole, plasma or serum), tobacco, and the like but which, nevertheless, are subject to deterioration by the action of microorganisms or enzymes. Also included are materials like pharmaceuticals which, whether essentially organic or inorganic, are subject to such deterioration or may serve as carriers of undesirable microorganisms. With such materials, both edible and inedible, the principal result of treatment by the present invention is preservation in packaged form. Also included in materials which, although deterioration thereof is not a principal problem nevertheless acts as carriers for microorganisms which can contaminate other materials or living bodies and which are, therefore, desirably sterilized. Most notable in this group are materials used in the practice of medicine, like instruments; textiles, such as surgical wearing apparel, towels and bed linen; surgical gloves, and the like.

The following examples are given for the purpose of illustration only and are not intended to limit the scope of the invention in any way.

In the examples, apparatus similar to that shown in FIGURES 1 and 2 is used. In Examples 1–48, 1 kw. magnetrons, and in the remaining examples, 2 kw. magnetrons, connected to a 220 volt source of alternating current are used. Each magnetron delivers microwave energy into the chamber at about 2450±25 megacycles at a wave length of about 4.8 inches. A refrigerated gas (carbon dioxide in Examples 44–48 and nitrogen in the remaining examples) at an inlet temperature and a pressure as noted below is flowed through the treating chamber and its temperature at the outlet is also noted. Various materials, as noted below, are subjected to the microwave energy for the exposure times set forth in the following table. In all the examples, after the source of microwave energy is turned off, the material undergoing treatment is left in the unit and the circulation of coolant gas is continued for a period of from about 2 to about 5 minutes to cool the package or container to below 150° F. to where it can be held by hand. Where the nature of the container permits, as, for example, in Examples 12–14, 17–20, 22, 23 and 48–53, it is then immersed in water further to cool the contents.

Examples 1–48 and 53 are directed to sterilization, for which the present invention is particularly valuable; Examples 49 and 50 are directed to pasteurization; and Example 51 is directed to pasteurization and sterilization.

The eggs of Example 21 were held in heat-sealed, polyethylene bags. Some of the treated eggs were incubated for 72 hours at 38° C. and others were held at room temperature for two months, with no sign of spoilage.

The beer of Example 22 was held in 12 oz. capped, glass bottles and that of Example 23 was held in 12 oz. capped "throwaway" bottles. After incubation for 72 hours, at 38° C., samples of each were opened and tested for sterility by filtering through a bacteria filter and preparing cultures from the residue on the filter. The beer was found to be completely sterile and to taste like the original, fresh untreated beer.

The foregoing examples deal with the sterilization of edible materials for the purpose of preservation. Obviously, there are other organic materials of natural origin which, although they are not intended for use as a food, also serve as media and nutrient for the growth of micro-

EXAMPLES 1-23

| Example: | Material treated | Gas in temperature (° F.) | Gas out temperature (° F.) | Time (secs.) | Gas pressure (p.s.i.g.) |
| --- | --- | --- | --- | --- | --- |
| 1 | Jelly-filled cup cakes | 40–45 | 75–80 | 20 | 3 |
| 2 | Jelly sandwich cake | 40–45 | 75–80 | 25 | 3 |
| 3 | Pineapple fruit rolls | 40–45 | 75–80 | 35 | 3 |
| 4 | Caramel nut roll | 40–45 | 75–80 | 40 | 3 |
| 5 | Mince pie | 40–45 | 75–80 | 25 | 3 |
| 6 | Lemon pie | 40–45 | 75–80 | 40 | 3 |
| 7 | Cherry pie | 40–45 | 75–80 | 45 | 3 |
| 8 | Apple pie | 40–45 | 75–80 | 45 | 3 |
| 9 | Short cake shells | 40–45 | 75–80 | 30 | 3 |
| 10 | Powdered sugar doughnuts | 40–45 | 75–80 | 35–40 | 3 |
| 11 | Loaf white bread | 20–26 | 40–64 | 75–180 | 3 |
| 12 | Whole raw milk | 40–45 | 75–80 | 45 | 3 |
| 13 | Fresh orange juice | 40–45 | 75–80 | 25 | 7 |
| 14 | do | 60 | 85 | 90 | 12 |
| 15 | Cooked hamburger in bun, pickles and onions | 40–45 | 75–80 | 30 | 0.5 |
| 16 | Frankfurters in bun | 40–45 | 75–80 | 45 | 10 |
| 17 | Slab bacon | 40–45 | 75–80 | 35 | 18 |
| 18 | Raw beef | 40–45 | 75–80 | 60 | 6 |
| 19 | do | 40–45 | 75–80 | 120 | 11.5 |
| 20 | Thawed, frozen oyster stew soup | 40–45 | 75–80 | 180 | 14 |
| 21 | Raw eggs | 30 | 50–60 | 30 | 0.5 |
| 22 | Unpasteurized bottled beer | 40–45 | 75–80 | 60 | 30 |
| 23 | do | 40–45 | 75–80 | 240 | 35 |

The baked goods of Examples 1–11 were held in heat sealed, polyethylene film bags. After treatment, the packaged materials were incubated for 72 hours at 38° C. All products were found to be free from mold and to have retained their original flavor and texture. The doughnuts of Example 11 had been pre-refrigerated to 35° F. to prevent dissolving of the powdered sugar in the fat.

The milk of Example 12 and the orange juice of Example 14 were held in capped, 7 oz. glass bottles during treatment, and the orange juice of Example 13 was held in heat-sealed, polyethylene terephthalate film pouches. Some treated samples of each were incubated for 72 hours at 38° C. and others were stored for three months at room temperature. The milk and juice showed no sign of deterioration. The milk smelled and tasted like pasteurized fresh milk, and there was no cooked flavor. The juice tasted like fresh orange juice.

The foods of Examples 15–20 were held in heat-sealed, polyethylene film bags. All treated packaged products were incubated for 72 hours at 38° C. with no sign of deterioration, whereas untreated, incubated controls gassed and the bread portions were badly molded.

organisms and thus should be sterilized for preservation. The following examples illustrate the treatment of such materials.

EXAMPLES 24-30

| Ex. | Material treated | Gas in temperature (° F.) | Gas out temperature (° F.) | Time (secs.) | Gas pressure (p.s.i.g.) |
| --- | --- | --- | --- | --- | --- |
| 24 | Human whole blood | 25 | 45 | 10 | 10 |
| 25 | Human blood plasma | 25 | 45 | 10 | 10 |
| 26 | Cigar wrapper leaves | 40–45 | 75–80 | 45 | 16 |
| 27 | Cigar binder strips | 40–45 | 75–80 | 30 | 10 |
| 28 | Whole cigars (box) | 40–45 | 75–80 | 30 | 10 |
| 29 | Whole cigars (individual) | 40–45 | 75–80 | 60 | 10 |
| 30 | Loose rough tobacco fines and sweepings | 40–45 | 75–80 | 60 | 10 |

The whole blood and blood plasma of Examples 24 and 25 were held in stoppered one pint glass bottles. After 28 days at room temperature all samples were found to be completely sterile, and the whole blood showed no signs of haemolizing.

The tobacco of Examples 26, 27 and 30 and the individual cigars of Example 29 were wrapped in heat-sealed polyethylene film bags. The cigars in the box of Example 28 were individually wrapped in cellophane and the box was also wrapped in cellophane. All tobacco, including cigar samples after incubation for 72 hours at 38° C., showed no sign of mold whereas untreated, incubated controls were badly molded.

The invention is also applicable to the sterilization of materials which, while the deterioration thereof through the growth of microorganisms thereon or therein is not the principal problem, can carry undesired microorganisms which can lead to contamination of other materials or infection of living bodies. Probably the most critical of these are the instruments, wearing apparel, towels, surgical and bed linen, and the like associated with medical practice. The following examples illustrate the treatment of such materials according to the present invention:

EXAMPLES 31-39

| Ex. | Material treated | Gas in temperature (° F.) | Gas out temperature (° F.) | Time (secs.) | Gas pressure (p.s.i.g.) |
|---|---|---|---|---|---|
| 31 | Surgeons rubber gloves | 40-45 | 75-80 | 30 | 9 |
| 32 | Examining rubber gloves | 40-45 | 75-80 | 30 | 9 |
| 33 | Examining rubber gloves (throwaway) | 40-45 | 75-80 | 30 | 9 |
| 34 | Hypodermic needles and syringes | 40-45 | 75-80 | 120 | 9 |
| 35 | Cotton surgical gowns | 40-45 | 75-80 | 90 | 9 |
| 36 | Cotton surgical smocks | 40-45 | 75-80 | 90 | 9 |
| 37 | Cotton surgical masks | 40-45 | 75-80 | 90 | 9 |
| 38 | Cotton surgical caps | 40-45 | 75-80 | 90 | 9 |
| 39 | Cotton surgical towels | 40-45 | 75-80 | 90 | 9 |

The materials of Examples 31-39 were held in heat-sealed polyethylene film packages. After treatment, the samples were incubated for 72 hours at 38° C. and were found to be completely sterile.

Further to illustrate the effect of the treatment of the present invention directly on microorganisms cultures of various microorganisms as follows were treated:

| | Microorganism | Gas in temperature (° F.) | Gas out temperature (° F.) | Time (secs.) | Gas pressure (p.s.i.g.) |
|---|---|---|---|---|---|
| Example: | | | | | |
| 40 | Staphylococcus (cult.) | 40-45 | 75-80 | 30 | 9 |
| 41 | Pseudomonas (cult.) | 40-45 | 75-80 | 60 | 9 |
| 42 | B. subtilis (cult.) | 40-45 | 75-80 | 30 | 9 |
| 43 | B. subtilis spores | 40-45 | 75-80 | 40 | 9 |

The microorganisms of Examples 40-43 were held in polystyrene, agar plates. After treatment, new cultures in agar were made from each sample, and these were incubated for 72 hours at 38° C. with no sign of growth. The treated samples themselves were also incubated for 72 hours at 38° C. with no sign of growth.

Carbon dioxide is equivalent to nitrogen as a coolant gas according to the present invention. Without unduly multiplying the examples, the following serve to illustrate the use of carbon dioxide with representative materials to be sterilized. In these examples the source of cold carbon dioxide gas was a cylinder of liquid carbon dioxide.

| Ex. | Material treated | Gas in temperature (° F.) | Gas out temperature (° F.) | Time (secs.) | Gas pressure (p.s.i.g.) |
|---|---|---|---|---|---|
| 44 | Cooked French toast | 30 | 50 | 60 | 7 |
| 45 | do | 25 | 35 | 120 | 28 |
| 46 | Broiled chopped beef cakes | 25 | 35 | 90 | 26 |
| 47 | do | 25 | 35 | 150 | 30 |
| 48 | Unpasteurized, unfiltered bottled beer | 25 | 35 | 30 | 20 |

The French toast and beef cakes of Examples 44-47 were sealed in polyethylene film bags. The treated products were incubated for 72 hours at 38° C. and were found to be completely sterile. The treated beer of Example 48 was tested for sterility by filtering through a bacteria filter and testing the residue on the filter. It was found to be completely sterile.

Example 49

This example illustrates the process of the present invention applied for pasteurization. One pound of raw hamburger in the form of a cylinder is wrapped and sealed in a sheet of rubber hydrochloride. It is then subjected to microwave energy as in the preceding examples, except that one 2 kw. magnetron delivering 2450±25 megacycles per second is employed, for 45 seconds in a moving atmosphere of nitrogen gas under a pressure of 2.5 p.s.i.g., an inlet temperature of about 40° F. and an outlet temperature of about 60° F.

The treated package and a similar, but untreated control package, were stored under refrigeration at 40° C. The control deteriorated in 7 days. The treated material, after 39 days, was examined and was found to be "mill fresh."

Example 50

This example also illustrates a form of pasteurization by the present process. Concentrated milk is artificially inoculated with B. subtilis (3,500,000 per ml.). Ten ounce samples thereof were sealed in glass bottles and subjected to microwave energy as in Example 49 for 4½ minutes in a circulating atmosphere of nitrogen gas under a pressure of 15 p.s.i.g., an inlet temperature of about 40° F. and an outlet temperature of about 60° F. One sample was refrigerated at 40° C. for two weeks at the end of which time it was examined and found to have a colony count of 58 spores per ml. The other sample was incubated at 37° C. where it did not spoil until the sixth day.

Example 51

In this example the material treated is a mixture of soybean and whey powder reconstituted to a 10% aqueous suspension to simulate the composition of non-fat milk. It contained a mixed bacterial population of over 100,000 per ml. The material was placed in 10 ounce glass bottles and capped. Lots of three such bottles each were subjected to microwave energy as in Example 49, for differing periods of time, using chilled nitrogen gas at a pressure of 15 p.s.i.g., an inlet temperature of about 40° F. and an outlet temperature of about 60° F. After an exposure of 165 seconds, the material had a bacterial count of over 1000 but less than 10,000. At exposures of 180, 195, 210, 225 and 240 seconds, respectively, the material was sterile with a bacteria count of 0. In all cases there was no coagulation and no change in flavor from the original, untreated, material.

Example 52

A mixed culture of *Escherischia coli, Pseudomonas aeruginosa, Staphylococcus aureus, Streptococcus faecalis* and *Mycobacterium phlei*, selected to represent groups of dangerous microorganisms, was suspended in various liquid media as set forth below. Sealed glass containers thereof were then subjected to microwave energy as in Example 49, for different lengths of time as set forth below, the nitrogen gas pressure being increased from 5 p.s.i.g. at the 1 minute exposure to 15 p.s.i.g. at the 5 minute exposure and having an inlet temperature of about 40° F. and an outlet temperature of about 60° F. The results in terms of microorganism count were as follows:

|  | Mineral oil | 1% Aqueous peptone | Trypticase soy broth |
|---|---|---|---|
| Time (minutes): |  |  |  |
| 0 (control) | $2.02 \times 10^8$ | $7.4 \times 10^8$ | $1.5 \times 10^9$ |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |

Modification is possible in the procedural techniques and conditions employed and materials treated as well as in the particular construction of the apparatus without departing from the scope of the present invention.

I claim:

1. In the control of substances selected from the group consisting of microorganisms and enzymes in material containing them by subjecting said material to microwave energy until the desired control is achieved, the improvement wherein the material is subjected, in a treating zone and while contained in a confined zone within said treating zone at least one wall of which confined zone is permeable to microwave energy, to said microwave energy through a moving atmosphere of coolant gas under superatmospheric pressure, until said control is achieved, said moving atmosphere being in direct contact with walls of said confined zone but out of direct contact with said material undergoing treatment and being at a temperature below about 60° F. upon its admission to said treating zone, and then discontinuing the passage of microwave energy into said material in said confined zone.

2. The method of claim 1 wherein, after the passage of microwave energy into the material is discontinued, the material in the confined zone is continued to be subjected to the action of said coolant gas.

3. The method of claim 1 wherein the microwave energy has a frequency of from about 1000 to about 5000 megacycles per second.

4. The method of claim 1 wherein the microwave energy has a frequency of from about 2000 to about 3000 megacycles per second.

5. The method of claim 1 wherein said material contains microorganisms and wherein it is subjected to microwave energy until sterile.

6. The method of claim 1 wherein said gas is selected from the group consisting of nitrogen and carbon dioxide, and is at a temperature no greater than about 50° F. when it is admitted to said treating zone.

7. The method of claim 6 wherein the temperature of said gas upon its admission to said treating zone is between about 30° F. and about 45° F.

8. The method of claim 7 wherein, after the passage of microwave energy into the material is discontinued, the material in the confined zone is continued to be subjected to the action of said coolant gas.

9. The method of claim 6 wherein spent coolant gas is removed from said treating zone, cooled and readmitted to said treating zone.

10. The method of claim 9 wherein, after the passage of microwave energy into the material is discontinued, the material in the confined zone is continued to be subjected to the action of said coolant gas.

11. The method of claim 9 wherein the microwave energy has a frequency of from about 1000 to about 5000 megacycles per second.

12. The method of claim 9 wherein the microwave energy has a frequency of from about 2000 to about 3000 megacycles per second.

13. The method of claim 9 wherein the microwave energy has a frequency of from about 2400 to about 2500 megacycles per second.

14. In the control of substances selected from the group consisting of microorganisms and enzymes in material containing them by subjecting said material to microwave energy until the desired control is achieved, the improvement wherein the material is subjected in a treating zone and while packaged in a container within said treating zone at least one wall of which container is permeable to microwave energy, to said microwave energy through a moving atmosphere of coolant gas under superatmospheric pressure until said control is achieved, said moving atmosphere being in direct contact with walls of said container but out of direct contact with said material and said gas being at a temperature below about 60° F. upon its admission to said treating zone, and thereafter discontinuing the passage of microwave energy into said material.

15. The method of claim 14 wherein contact of said moving atmosphere of coolant gas with walls of said container is continued after said discontinuance of the passage of microwave energy.

16. In the control of substances selected from the group consisting of microorganisms and enzymes in liquid and semi-liquid perishable material containing them by subjecting said material to microwave energy until the desired control is achieved, the improvement wherein said material is flowed along a confined pathway, walls of which are permeable to microwave energy, in a treating zone; and wherein said material while in said confined pathway is subjected to microwave energy through a moving atmosphere of coolant gas under superatmospheric pressure and admitted to said treating zone at a temperature below about 60° F., said atmosphere of coolant gas being in direct contact with walls of said confined pathway but out of direct contact with said perishable material, until said control is achieved, and thereafter discontinuing the passage of microwave energy into said material.

17. The method of claim 16 wherein, after the passage of microwave energy into the material is discontinued, the material in the confined pathway is continued to be subjected to the action of said coolant gas.

18. The method of claim 16 wherein spent coolant gas is removed from said treating zone, cooled and readmitted to said treating zone.

19. The method of claim 18 wherein, after the passage of microwave energy into the material is discontinued, the material in the confined pathway is continued to be subjected to the action of said coolant gas.

20. In the control of substances selected from the group consisting of microorganisms and enzymes in material containing them by subjecting the material to microwave energy until the desired control is achieved, the improvement wherein the material packaged in a plurality of individual containers at least one wall of each of which is permeable to microwave energy, is moved through a microwave treating zone; and wherein the material in said moving containers in said microwave treating zone is subjected to microwave energy through a moving atmosphere of coolant gas under superatmospheric pressure until said control is achieved, said moving atmosphere being in direct contact with walls of said containers but out of direct contact with said material and said gas being at a temperature below about 60° F. upon its admission to said treating zone, and thereafter removing said containers from said microwave treating zone.

21. The method of claim 20 wherein after the containers are removed from the microwave treating zone they are still subjected to the moving atmosphere of coolant gas.

22. The method of claim 21 wherein said gas atmosphere moves substantially counter to the movement of containers.

23. The method of claim 22 wherein spent coolant gas is removed from said treating zone, cooled and readmitted to said treating zone.

24. Apparatus for controlling microorganisms and enzymes in material containing them which comprises a chamber; microwave energy generation means adapted to direct microwave energy into said chamber; means for holding the material to be treated in a confined zone, in said chamber in a position to receive said microwave energy; means for cooling a gas; means for admitting said cooled gas to said chamber under superatmospheric pressure for contact with said confined zone containing said material whereby said cooled gas contacts outer surfaces of said confined zone but is out of contact with said material within said confined zone, and means for removing said gas from said chamber.

25. Apparatus of claim 24 including means for continuing contact of said confined zone containing said material with said cooled gas after said material has stopped receiving said microwave energy.

26. Apparatus for controlling microorganisms and enzymes in flowable liquid and semiliquid materials which comprises a chamber; means for moving said material within a confined path within said chamber which means include a wall permeable to microwave energy; microwave generating means adapted to direct microwave energy through said wall into said confined path; means for admitting flowable material to one end of said confined path; means for removing flowable material from the other end of said confined path; means for cooling a gas; means for admitting said cooled gas to said chamber under superatmospheric pressure whereby said cooled gas contacts outer surfaces of said confined path but is out of contact with said material within said confined path, and means for removing said gas from said chamber.

27. The apparatus of claim 26 including means for recirculating said gas removed from said chamber to said gas cooling means and wherein the positions of the means for admitting said cooled gas and the means for removing said gas are such as to provide a flow of gas substantially counter to the movement of said material.

28. The apparatus of claim 27 wherein a downstream portion of said confined path is located out of the field of said microwave generating means but within the flow path of said cooled gas.

29. Apparatus for controlling microorganisms and enzymes in material in a plurality of packages which comprises a chamber; a supporting surface within said chamber adapted for movement through said chamber; means for admitting packages to said chamber and onto said movable supporting surface; means for removing packages from said chamber and said movable supporting surface; microwave generating means adapted to direct microwave energy to said packages on said movable supporting surface; means for cooling a gas; means for admitting said cooled gas to said chamber, and means for removing gas from said chamber.

30. The apparatus of claim 29 including means for recirculating said gas removed from said chamber to said gas cooling means, and wherein the position of the means for admitting said cooled gas and the means for removing said gas are such as to provide a flow of gas substantially counter to the movement of said supporting surface.

31. The apparatus of claim 30 wherein a downstream portion of said movable supporting surface is located out of the field of said microwave generating means but within the flowpath of said cooled gas.

References Cited

UNITED STATES PATENTS

| 2,576,862 | 11/1946 | Smith et al. | 99—221 |
|---|---|---|---|
| 2,585,970 | 2/1952 | Shaw | 99—221 |
| 3,092,503 | 6/1963 | Gray | 21—54 XR |
| 3,166,663 | 1/1965 | Fritz | 219—10.55 |
| 3,215,539 | 11/1965 | Landy | 21—102 XR |
| 3,271,169 | 9/1966 | Baker et al. | 99—221 |
| 3,272,636 | 9/1966 | Fehr et al. | 99—221 |
| 3,365,562 | 1/1968 | Jeppson. | |
| 3,409,447 | 11/1968 | Jeppson | 99—217 XR |

FOREIGN PATENTS 947,280  1/1964  Great Britain.

BARRY S. RICHMAN, Primary Examiner

MORRIS O. WOLK, Assistant Examiner

U.S. Cl. X.R.

21—93, 102; 99—21, 150, 217, 221, 253; 131—121; 195—121; 219—10.55